P. PRINGLE.
VALVE SPRING LIFTER.
APPLICATION FILED MAY 3, 1919.

1,361,492.

Patented Dec. 7, 1920.
2 SHEETS—SHEET 1.

Inventor
P. Pringle
by
Fetherstonhaugh & Co
atty's

P. PRINGLE.
VALVE SPRING LIFTER.
APPLICATION FILED MAY 3, 1919.

1,361,492.

Patented Dec. 7, 1920.
2 SHEETS—SHEET 2.

Inventor
P. Pringle
By Fetherstonhaugh & Co
Attys

UNITED STATES PATENT OFFICE.

PHILIP PRINGLE, OF LIPTON, SASKATCHEWAN, CANADA.

VALVE-SPRING LIFTER.

1,361,492.    Specification of Letters Patent.    Patented Dec. 7, 1920.

Application filed May 3, 1919. Serial No. 294,525.

*To all whom it may concern:*

Be it known that I, PHILIP PRINGLE, of the town of Lipton, in the Province of Saskatchewan, Canada, have invented certain new and useful Improvements in Valve-Spring Lifters, of which the following is the specification.

The invention relates to improvements in valve spring lifters and the principal object of the invention is to provide an easily constructed and easily operated device for simultaneously lifting the valve springs of an automobile engine and thereby permitting of the releasing of the valves for grinding or other such purposes.

A further object of the invention is to construct the appliance so that it can be readily attached or removed and can be positively relied upon not only to simultaneously raise the valve springs but to lock them in the raised position, thereby giving one the free use of their hands once the springs have been raised.

With the above general objects in view the invention consists essentially in the arrangement and construction of parts hereinafter more particularly described and later pointed out in the appended claims, reference being had to the accompanying drawing in which:—

In the drawings like characters of reference indicate corresponding parts in the several figures.

Figure 1:
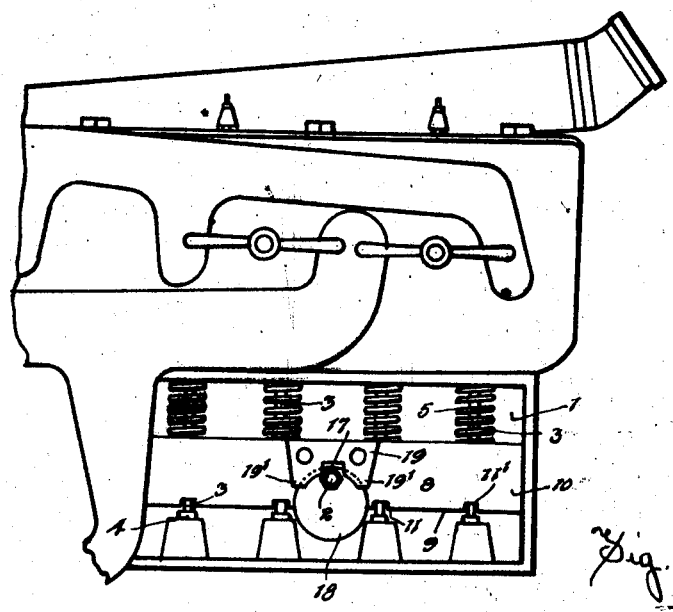
Figure 1 represents a side view of an automobile engine showing my invention applied thereon and in the non-operating or lowermost position.
Figure 2:
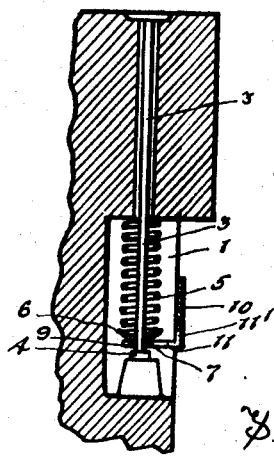
Fig. 2 represents an enlarged detailed vertical sectional view through one of the valves and with my device shown in the position occupied in Fig. 1.
Figure 3:
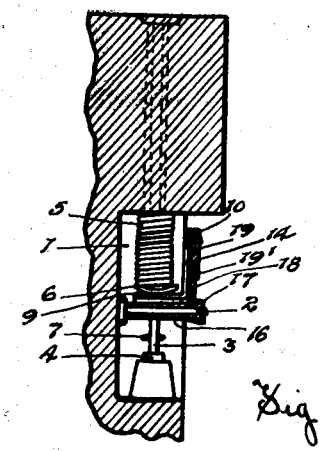
Fig. 3 represents an enlarged detailed sectional view through the stationary fastening pin and with my device appearing in the raised position.
Figure 4:
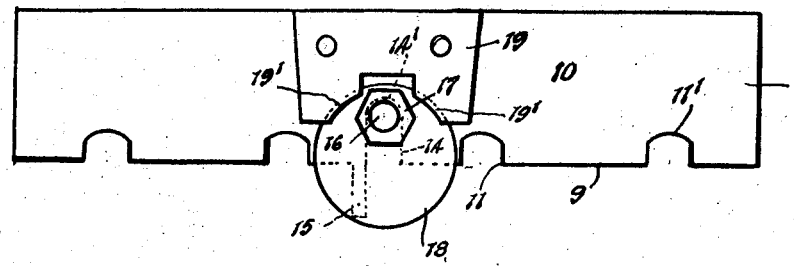
Fig. 4 represents an enlarged detailed front view of the valve lifter detached from the engine.
Figure 5:
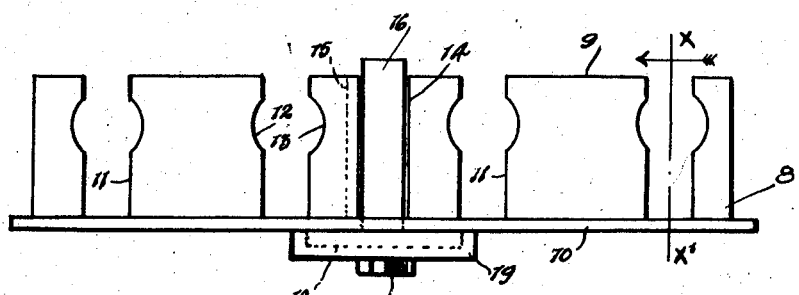
Fig. 5 represents a plan view of the same.
Figure 6:
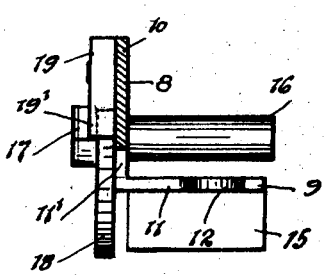
Fig. 6 represents a sectional view at X—X' Fig. 5.

According to present practice the valve springs of automobile engines, particularly the engines of Ford cars, are in most instances raised by a lever like lifter which only raises one spring at a time. My device, shortly described, is arranged to raise all valve springs together and lock them when raised. In this way I save considerable time and labor and give one the free use of his hands for valve grinding or other purposes.

Referring now to the drawings; 1 represents the valve spring chamber provided in the side of the engine and which is customarily covered over by a releasable closure plate (not shown). Centrally of the chamber, an outwardly extending fastening pin 2 is provided, this pin having its outer end threaded and provided with a nut and being utilized to hold the ordinary closure plate in closed position.

The chamber houses the valve stems 3, the push rods 4, the valve springs 5 and the valve spring seats or cups 6, the cups engaging removable pins 7 passing through the stems.

The above parts are of ordinary construction and I have not accordingly considered it necessary to give a detailed description of them. In practice the springs operate to hold the valve stems normally down and engaged with the push rods, it being understood that the seating and unseating of the valves is governed by suitable cams controlling the push rods.

In practice it is quite often necessary to grind the valve or the valve seats and at such a time one has to remove the pins 7 in order to release the valves. This is done by bodily raising the cups or valve spring seats 6 against the action of the springs and clear of the pins. My lifter which is designed to accomplish this work is now described in detail.

8 represents a lifting bar of angle iron cross section and presenting a horizontal wing 9 and a vertical wing 10. The horizontal wing is of such a length that it will go freely within the opening 1 while the vertical wing is somewhat longer so that it will seat outside the opening at the ends. The horizontal wing 9 is provided with a plurality of slots 11, the slots being spaced apart to correspond with the valve stems or in other words when the lifting plate is inserted the slots receive the valve stems, spanning them. The slots completely cross the wing 9 and extend upwardly a short distance into the wing 10, the extensions being shown at 11'. The edges of the slots are gouged out as indicated at 12 and 13 to form seats for the cups as later explained, Centrally of its length the lifting plate is fitted with a cross slot 14 which extends completely across the horizontal wing and well up into the vertical wing terminating at 14'. 15 represents a vertically disposed guide flange extending downwardly from one of the edges of the latter slot. 16 represents a tube designed to receive the fastening pin 2 and of a length such that the inner end will strike the wall of the engine cylinder when the vertical wing is in working position against the ends of the chamber. The outer end of the tube is formed into a nut like head 17 utilized for turning the tube on the spindle as shortly explained. 18 represents an eccentric disk secured permanently to the outer end of the tube and positioned immediately in advance of the vertical wing. 19 represents a riding plate permanently secured to the vertical wing and riding the exposed edge of the disk. The eccentric disk and riding plate are constructed such that when the disk is in the position as shown in Fig. 1 the wing 9 is spanning all the valve stems and with the valve spring seats or cups positioned immediately above the said wing, that is to say directly over the gouged out or cut away parts 12 and 13 of the slots.

The riding plate is fitted with portions 19' which overhang the disk and prevent the lifting plate from canting under the action of the springs when the device is in use. When one desires to raise the valves he applies a wrench or similar tool to the head 17 of the tube and turns the disk half a revolution which action bodily raises the lifting plate a distance equal to the eccentric throw of the disk. The lifting plate in rising carries with it the valve spring seats and frees the valves so that they can be readily raised and also exposes the pins 7 so that they can be easily withdrawn if it is desired to remove the valves.

Here it will be observed that in the raised position of the lifting plate it becomes automatically locked, this occurring when the disk reaches what might be termed the dead center position. Accordingly one is entirely free to use both hands for valve grinding or other such purposes.

In actual practice, particularly from the standpoint of shipping and marketing, it would be desirable to have the tube and eccentric disk arranged so that they cannot be removed from the lifting plate. Any suitable arrangement can be provided for this purpose, it being only necessary that the movement of the parts be not interfered with when the lifter is in use.

What I claim as my invention is:—

1. A valve spring lifter comprising a lifting plate adapted to engage the under sides of a plurality of valve spring seats, and an eccentric disposed with the peripheral edge thereof having lifting engagement with said plate and designed in the rotation of the eccentric to bodily raise the plate through such engagement and simultaneously lift the valve spring seats.

2. A valve spring lifter comprising a lifting plate presenting a horizontal and a vertical wing and having the horizontal wing slotted at intervals to admit the stems of the valves, a plate constituting a riding plate secured on one side of the vertical wing of said lifting plate, and an eccentric disk disposed with the peripheral edge thereof having lifting engagement with said riding plate and designed in the rotation of the eccentric to elevate the said riding plate and the lifting plate.

3. A valve spring lifter comprising a lifting plate presenting a horizontal and a vertical wing and having the horizontal wing slotted at intervals to admit the stems of the valves, a riding plate located centrally of the vertical wing, an eccentric disk positioned adjacent to the vertical wing and engaging the riding plate, a centering tube extending from the disk and extending into and through the vertical wing, said vertical wing and horizontal wing being slotted to allow of the movement of the lifting plate in the turning of the disk.

4. A valve spring lifter comprising a lifting plate, a riding plate, and a rotatable eccentrically mounted member disposed beneath the riding plate and in engagement therewith and designed, in the rotation of said member to elevate said lifting plate.

Signed at Winnipeg, this 17th day of April, 1919.

PHILIP PRINGLE.

In the presence of—
G. S. ROXBURGH,
E. H. SEGVALDASON.